United States Patent [19]

Murakami et al.

[11] Patent Number: 5,246,360
[45] Date of Patent: Sep. 21, 1993

[54] GREEN TIRE CHARGING APPARATUS FOR A TIRE VULCANIZING MACHINE

[75] Inventors: Toshifumi Murakami; Akira Hasegawa, both of Nagasaki, Japan

[73] Assignee: Mitsubishi Jukogyo Kabushiki Kaisha, Tokyo, Japan

[21] Appl. No.: 987,566

[22] Filed: Dec. 8, 1992

Related U.S. Application Data

[63] Continuation of Ser. No. 798,604, Nov. 26, 1991, abandoned.

[30] Foreign Application Priority Data

Nov. 28, 1990 [JP] Japan .............................. 2-124296[U]

[51] Int. Cl.$^5$ .................................................. B29C 35/00
[52] U.S. Cl. .......................................... 425/33; 425/48; 425/54
[58] Field of Search ....................... 425/28.1, 33, 47, 48, 425/54

[56] References Cited

U.S. PATENT DOCUMENTS

| | | |
|---|---|---|
| 2,997,738 | 8/1961 | Soderquist . |
| 3,471,895 | 10/1969 | Ulm et al. . |
| 3,530,533 | 9/1970 | Turk et al. . |
| 3,976,409 | 8/1976 | Athey .................................... 425/48 |
| 4,045,150 | 8/1977 | Gazuit . |
| 4,190,406 | 2/1980 | Geck et al. . |
| 4,236,883 | 12/1980 | Turk et al. . |
| 4,279,856 | 2/1981 | Vente et al. ..................... 425/54 X |
| 4,444,715 | 4/1984 | Nixon et al. ..................... 425/33 X |
| 4,452,577 | 6/1984 | Irie .................................... 425/33 X |
| 4,474,399 | 10/1984 | Lauber . |
| 4,871,305 | 10/1989 | Galigani . |

FOREIGN PATENT DOCUMENTS

| | | |
|---|---|---|
| 2176503 | 11/1973 | France . |
| 2239435 | 5/1977 | France . |
| 2-200405 | 8/1990 | Japan . |
| 1177617 | 1/1970 | United Kingdom . |

*Primary Examiner*—Charles Hart
*Attorney, Agent, or Firm*—Wenderoth, Lind & Ponack

[57] ABSTRACT

In a green tire charging apparatus for a tire vulcanizing machine according to the present invention, provision is made such that a vertically movable chuck body is inserted into a tire, chuck segments which are synchronously slidable in the radial direction are expanded to concentrically hold an upper bead portion by upper projections of centering rods, the chuck body is raised to insert the upper bead portion into an upper bead ring of a metal mold, subsequently the upper bead portion is held by holder arms of holders, the chuck body is lowered to hold a lower bead portion of the tire by lower projections of the centering rods, and the lower bead portion is inserted into a lower bead ring of the metal mold. Owing to the above-mentioned the upper and lower bead portion of provision, even a deformed green tire can be surely set on the upper and lower bead rings, respectively, of the metal mold.

2 Claims, 6 Drawing Sheets

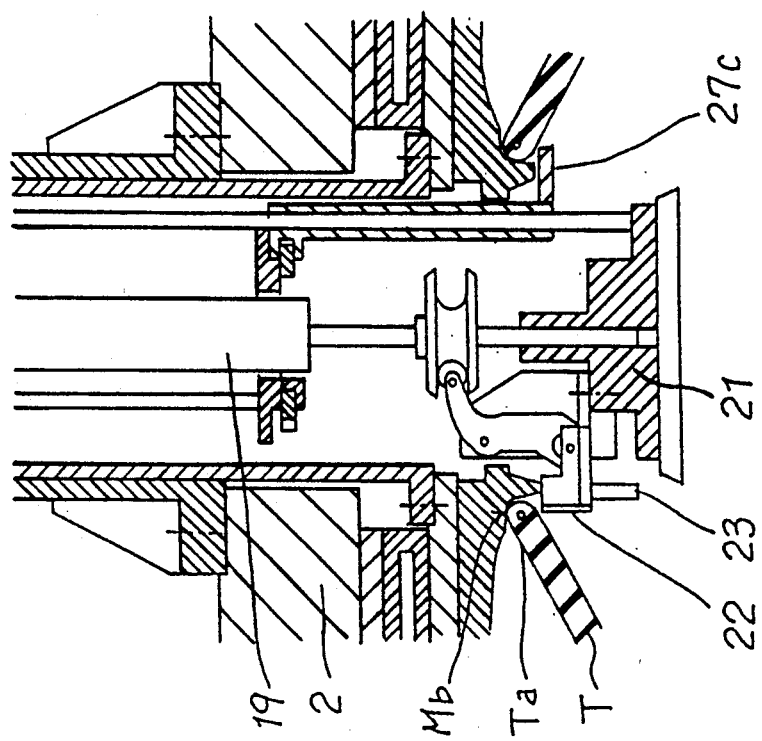
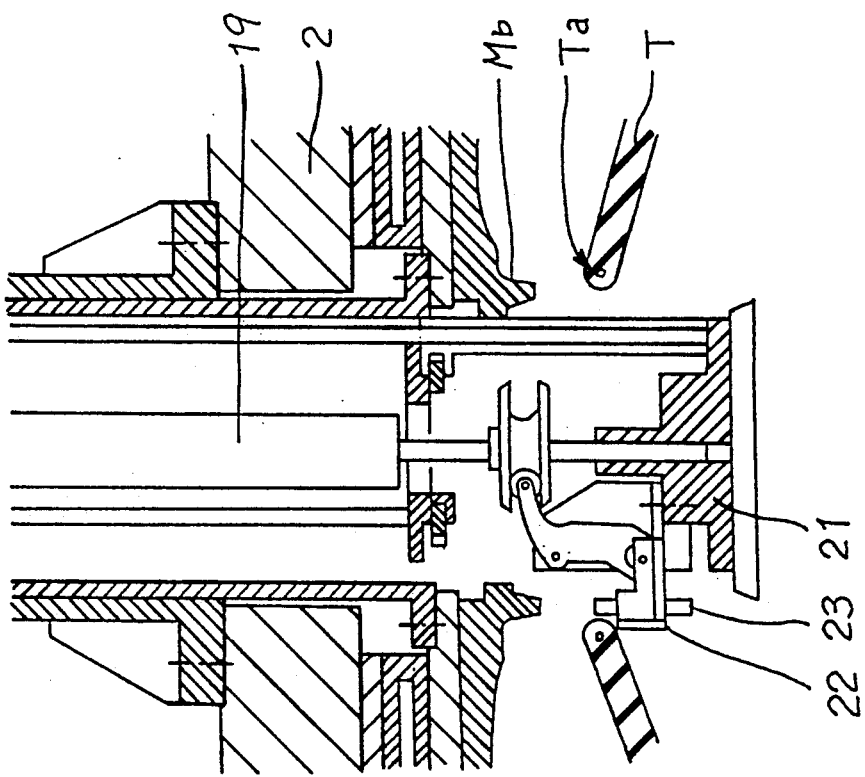

ical machine, in which upper and lower
GREEN TIRE CHARGING APPARATUS FOR A TIRE VULCANIZING MACHINE This application is a continuation of now abandoned application Ser. No. 07/798,604, filed on Nov. 26, 1991, abandoned.

BACKGROUND OF THE INVENTION

1. Field of the Invention

The present invention relates to an apparatus for charging a green tire into a tire vulcanizing machine while centering the former with respect to the latter.

2. Description of the Prior Art

The inventors of this invention under application previously invented a method and an apparatus for forcibly centering and inserting upper and lower bead portions of a green tire with respect to and into upper and lower bead rings of a metal mold, and a patent application was filed at the Japanese Patent Office as Japanese Patent Application No. 01-019869 (1989). Also, in the specification of U.S. Pat. No. 4,444,715 is disclosed the technique of feeding pressurized gas into a green tire for the purpose of preventing an upper bead portion of a green tire from slipping out and falling due to the weight of the green tire.

Since crude rubber has the nature that it becomes fluidness if heat is applied thereto, depending upon the time elapsed before a predetermined pressure is attained after shaping steam was injected into a green tire carried in and mounted to a metal mold, sometimes an upper bead portion of the green tire inserted into an upper bead ring of the metal mold would slip out due to the weight of the green tire. Moreover, since upper and lower bead portions of a green tire carried in a tire vulcanizing machine are more or less deformed and a concentricity, a degree of parallelism and the like are low, depending upon a degree of deformation, sometimes a bead portion of a green tire on the side which is inserted first into a bead ring would slip out due to reaction forces for reforming these deformations.

As a counter-measure against the above-mentioned problems in the prior art, in the specification of U.S. Pat. No. 4,444,715 is proposed a method for preventing an upper bead portion of a green tire from slipping out of an upper bead ring by injecting pressurized fluid into a green tire and causing the fluid pressure to support the weight of the green tire. However, this proposed method still involves problems such that a large amount of pressurized fluid is consumed due to the presence of irregularities such as joints of members on the surfaces of bead portions of a tire, and depending upon a degree of deformation of a green tire, it would be difficult even to raise an inner pressure of a green tire.

Although it would be conceived by anybody that if any mechanism for mechanically preventing bead portions of a green tire from slipping out is assembled, the above mentioned problems will be resolved. However, generally a chuck mechanism or the like (commonly called "upper center mechanism") is assembled inside of the upper bead ring, while a bladder operation mechanism (commonly called "lower center mechanism") is assembled inside of the lower bead ring. Therefore, because of spatial restriction, the above-mentioned method has not been realized.

SUMMARY OF THE INVENTION

It is therefore one object of the present invention to provide an improved green tire charging apparatus for a tire vulcanizing machine, in which upper and lower bead portions of a tire can be made to surely sit on the corresponding bead rings of a metal mold even if a green tire is used which has a degree of parallelism between the upper and lower bead portions degraded due to deformation and in which the problem in the prior art of consuming a large amount of compressed fluid can be obviated.

According to one feature of the present invention, there is provided a green tire charging apparatus for a tire vulcanizing machine constructed in such manner that holders having holder arms projected horizontally from their bottom ends are elevatably and rotatably fitted around posts connecting a chuck body with a chuck upper plate mounted to a bottom end of a chuck elevator cylinder fixed to the inside of an inner cylinder for operating metal mold means. A plurality of chuck segments which are synchronously slidable in radial directions are provided on the chuck body, and each chuck segment is provided with a centering rod, which projects a little from the upper and lower surfaces of the same segment at a position somewhat inside of its outer end, and which is vertically slidable. The aforementioned chuck body is inserted into a tire, the aforementioned chuck segments are expanded to concentrically hold an upper bead portion by means of upper projections of the centering rods, the above-mentioned chuck body is raised to insert the upper bead portion into an upper bead ring, and subsequently the aforementioned holder arms are made to swing out and rise to hold the upper bead portion. Then the above-described chuck body is lowered to concentrically hold a lower bead portion by means of lower projections of the centering rods and to insert the lower bead portion into a lower bead ring.

According to another feature of the present invention, there is provided the above-featured green tire charging apparatus for a tire vulcanizing machine, in which each of the above-mentioned chuck segments is made to slide in the radial directions due to engagement with one end of a lever having its other end engaged with a cam plate fixedly secured to a piston rod of a chuck opening cylinder fixed to the chuck upper plate.

In essence, the characteristic features of the present invention reside in the following points:

(1) Posts forming chuck members in an upper center mechanism are utilized, and holders for supporting an upper bead portion of a green tire from its inside are mounted in an elevatable and swingable manner as guided by the aforementioned posts.

(2) In order to prevent interference with chuck members, the holders are constructed in such manner that they can rise and fall only when the holder arms are swung out.

The above-featured green tire charging apparatus for a tire vulcanizing machine according to the present invention, operates in the following manner.

After a chuck has been lowered to a position just below the upper bead portion of a green tire, centering of the above-mentioned upper bead portion is effected by expanding the chuck in diameter.

Then, the aforementioned upper bead portion is forcibly inserted into an upper bead ring by raising the chuck. During this step of operation, the holder arms are kept swung out.

Next, the holders are raised to make them support the inserted bead portion so as not to slip out of the upper bead ring.

Subsequently, the chuck is once contracted in diameter and is lowered to a position just above the lower bead portion of the green tire from above, and thereafter centering of the lower bead portion is effected by again expanding the chuck in diameter.

Next, the upper metal mold is lowered until the chuck is pushed back a little to forcibly insert the lower bead portion into the lower bead ring and also to prevent the weight of the green tire from acting upon the upper bead ring.

In this way, when the centering and insertion of the upper and lower bead portions with respect to and into the corresponding bead rings have been finished, the chuck and the holders are returned to the original state, a bladder is inserted to the inside of the green tire and inflated, and thereafter conventional shaping is effected.

Owing to the above-mentioned construction and operation of the green tire charging apparatus for a tire vulcanizing machine, according to the present invention, the upper and lower bead portions of a tire can be made to surely sit on the corresponding bead rings of a metal mold, even if the tire has a degree of parallelism between the upper and lower bead portions degraded due to deformation, and also the problem in the prior art of consuming a large amount of compressed fluid can be obviated.

The above-mentioned and other objects, features and advantages of the present invention will become more apparent by reference to the following description of one preferred embodiment of the invention taken in conjunction with the accompanying drawings.

BRIEF DESCRIPTION OF THE DRAWINGS

In the accompanying drawings:

FIGS. 5 to 7 are vertical cross-section views taken along line V—V in FIG. 2 showing operating states of an essential part of the same apparatus in the successive steps of a green tire charging operation.

DESCRIPTION OF THE PREFERRED EMBODIMENT

Figure 1:
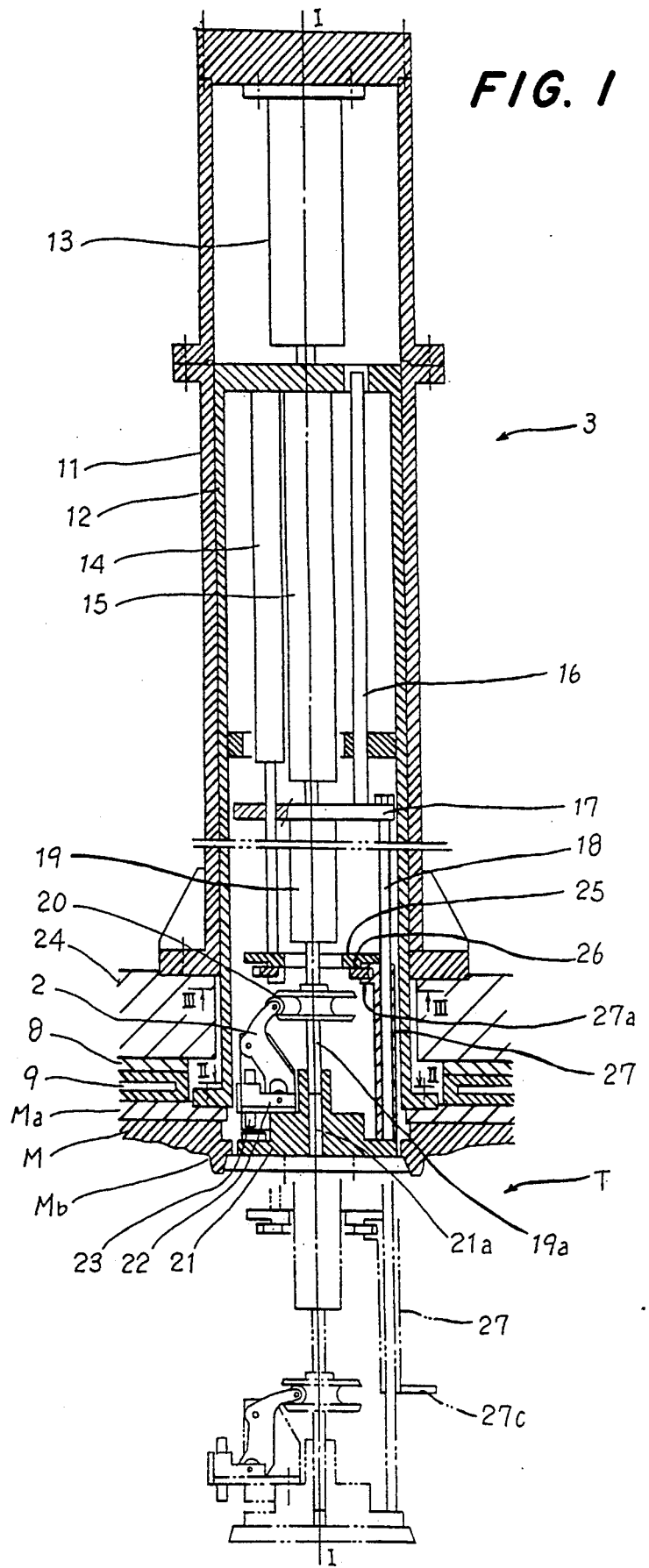
FIG. 1 is a vertical cross-section view of an upper center mechanism in a green tire charging apparatus for a tire vulcanizing machine according to one preferred embodiment of the present invention.
Figure 2:
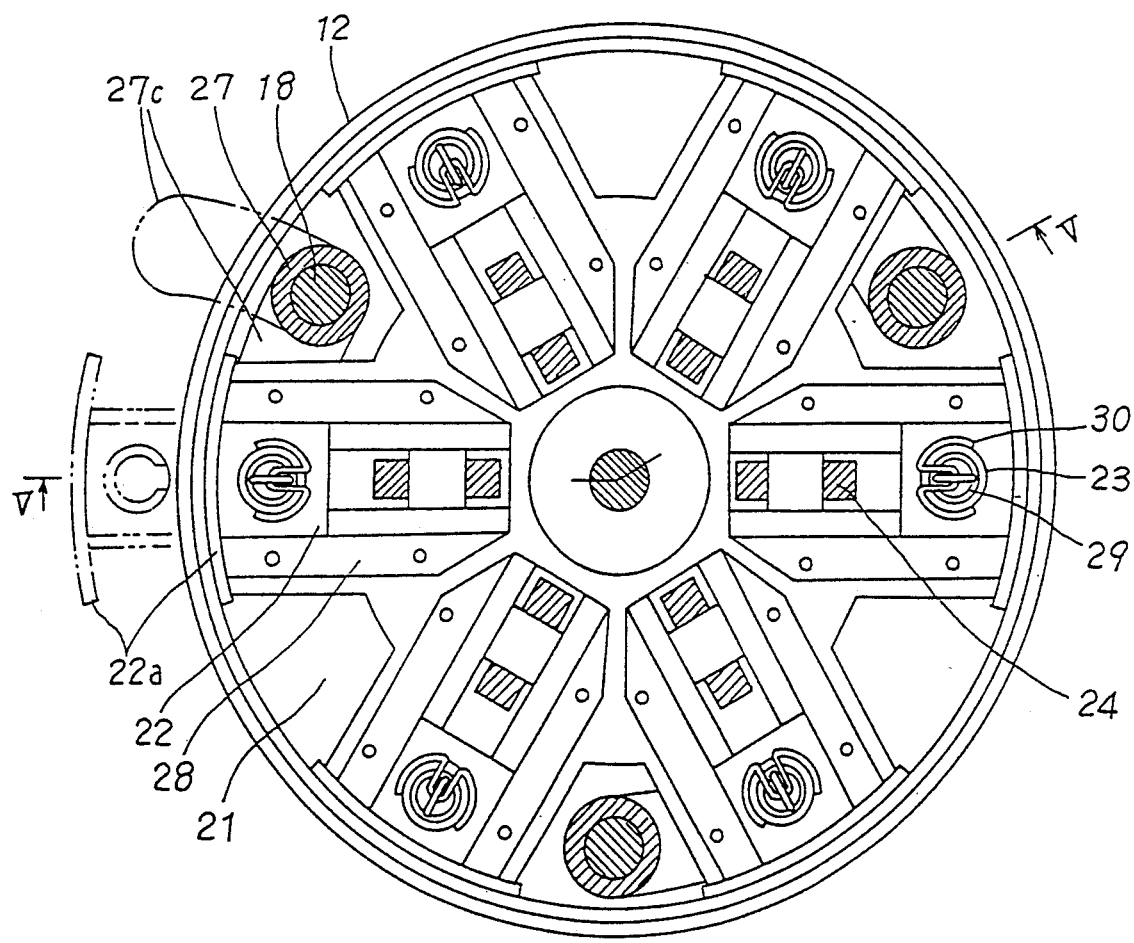
FIG. 2 is a horizontal cross-section view taken along line II—II in FIG. 1 as viewed in the direction of arrows.
Figure 3:
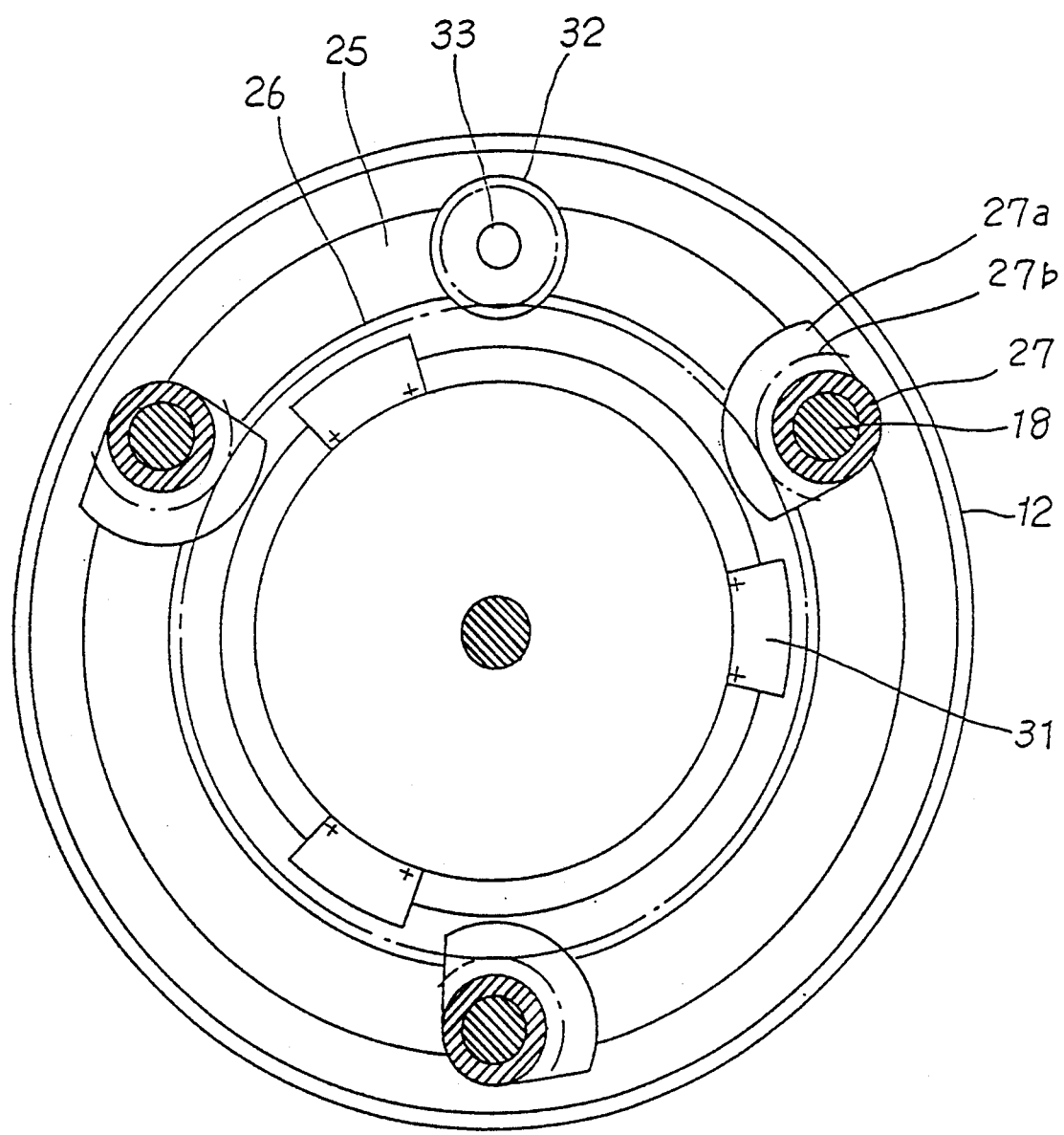
FIG. 3 is another horizontal cross-section view taken along line III—III in FIG. 1 as viewed in the direction of arrows.
Figure 4:
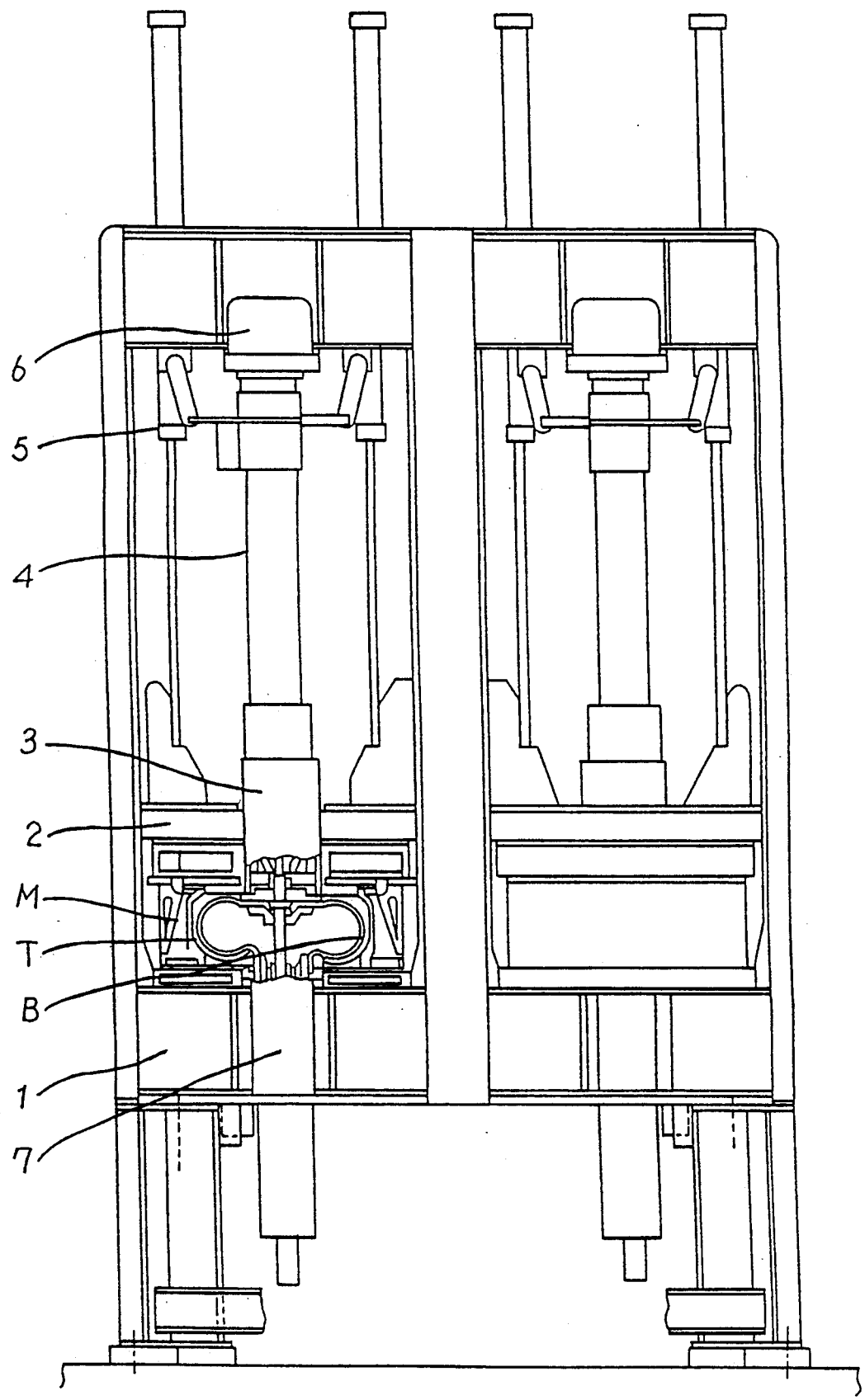
FIG. 4 is a front view partly in cross-section of a tire vulcanizing machine.

Now, the present invention will be described in greater detail with respect to one preferred embodiment of the invention illustrated in FIGS. 1 to 7. It is to be noted that as shown by arrowed line V—V in FIG. 2, the left half and the right half of FIG. 1 show vertical cross-sections at different angular positions in out-of-phase relation. FIG. 4 shows an entire tire vulcanizing machine during a tire vulcanizing operation.

In these figures, reference numeral 1 designates a main body frame, numeral 2 designates a bolster adapted to be raised and lowered by an elevator cylinder 5 as guided by the main body frame 1, reference character M designates well-known split metal mold means mounted between the main body frame 1 and the bolster 2 via heat insulating material 8 and a heater plate 9, reference character T designates a tire, character B designates a bladder, numeral 4 designates a swing spacer, numeral 6 designates a pressurizing cylinder, numeral 3 designates an upper center mechanism, and numeral 7 designates a lower center mechanism for operating the bladder B.

Since the members other than the upper center mechanism 3 are well known, detailed description thereof will be omitted.

The upper center mechanism 3 is composed of an outer cylinder 11 for transmitting an output of the pressurizing cylinder 6 to the bolster 2 via the swing spacer 4, an inner cylinder 12 for operating the split metal mold means slidably inserted into the outer cylinder 11 as guided by the inner circumferential surface of the latter, a split metal mold means operating cylinder 13 fixedly secured to a top flange of the outer cylinder 11 and having a tip end of a piston rod fixed to the top end of the inner cylinder 12, a chuck elevator cylinder 15 having one end fixedly secured to a top flange of the inner cylinder 12, a chuck upper plate 17 having a tip end of a piston rod of the chuck elevator cylinder 15 fixedly secured thereto and also having bottom ends of a plurality of guide rods 16 slidably guided by the inner cylinder 12 fixedly secured thereto, a plurality of posts 18 connecting the chuck upper plate 17 with a chuck body 21, a chuck opening/closing cylinder 19 fixedly secured to the chuck upper plate 17 and having a tip end of its piston rod slidably guided by a hole 21a formed in the chuck body 21, a cam plate 20 fixedly secured to the piston rod of the chuck opening/closing cylinder 19, a plurality of chuck segments 22 which are slidable in the radial directions as guided by the chuck body 21 and brackets 28 fixed to the chuck body 21, a plurality of levers 24 swingably mounted to the brackets 28 via pins and having first ends engaged with the cam plate 20 and second ends engaged with the chuck segments 22, centering rods 23 elevatably assembled in the respective chuck segments 22 and having their upper and lower end portions held projected from the chuck segments 22 by means of coil springs 29 and keepers 30 (See FIG. 2), a plurality of holder elevator cylinders 14 having first ends fixedly secured to the upper flange of the inner cylinder 12, a guide ring 25 having tip ends of piston rods of the holder elevator cylinders 14 fixedly secured thereto and adapted to be raised and lowered as guided by the posts 18, a gear 26 which is rotatable as guided by the guide ring 25 and guides 31, holders 27 slidably guided by the posts 18 and having, at their top ends, sector-shaped flanges 27a adapted to place the upper and lower surfaces of the gear 26 therebetween as well as a sector-shaped gear meshed with the gear 26 and further having at their bottom ends holder arms 27c, shafts 33 rotated by the action of a rotary actuator (not shown) fixed to the top surface of the inner cylinder 12 as guided by the rotary actuator and the guide ring 25, and small gears 32 fixed to the bottom ends of the shafts 33 and engaged with the gear 26.

It is to be noted that in FIG. 1, reference character Ma designates a top plate forming a part of the well-known split metal mold means M, character Mb designates an upper bead ring, and a pressure receiving plate (not numbered) is engaged with the inside of the upper bead ring Mb and fastened by bolts to the chuck body 21.

Now, description will be made of the operation of the above-described preferred embodiment.

At first, the upper bead portion Ta of the green tire T and the upper bead ring Mb of the metal mold M are brought close to each other. Then the chuck body 21 is lowered by the action of the cylinder 15, the chuck segments 22 are expanded in diameter by the action of the cylinder 19 so as to be positioned just below the upper bead portion Ta of the green tire T, and centering of the upper bead portion Ta is effected by means of the upper projections of the centering rods 23 (See FIG. 5).

Next, the expanded chuck segments 22 are raised by actuating the cylinder 15 in the reverse direction to forcibly insert the upper bead portion Ta into the upper bead ring Mb, and thereafter the holder arms 27c are made to swing out by the action of the rotary actuator not shown and are made to rise by the action of the cylinder 14 to make them support the upper bead portion Ta (the right side of FIG. 6). It is to be noted that at this time the centering rods 23 are relatively lowered as pressed by the upper bead ring Mb.

Figure 7:
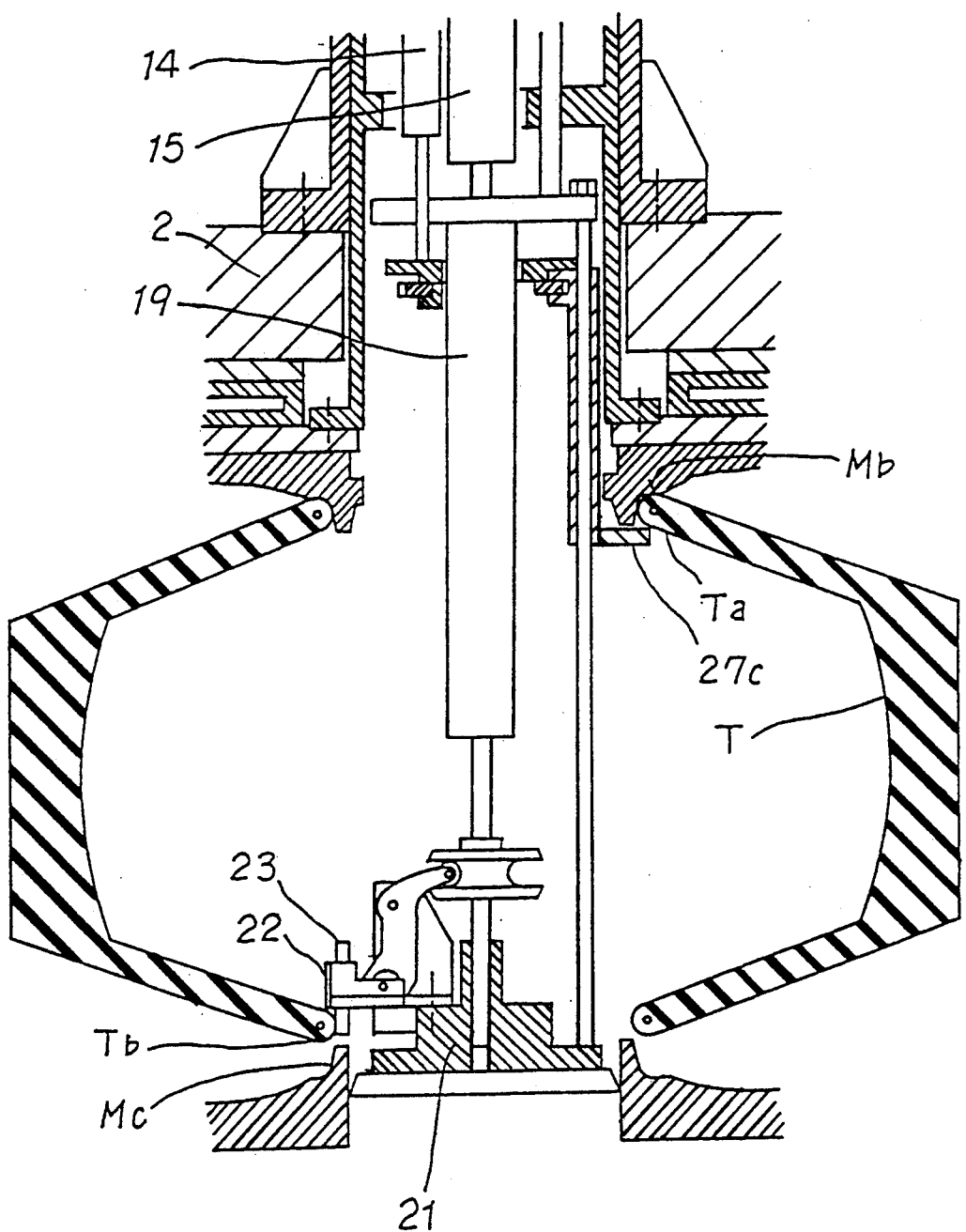

Subsequently, the chuck segments 22 are contracted in diameter by actuating the cylinder 19 (the centering rods 23 are returned to the state in which they project both upwards and downwards by the action of the springs 29), after the chuck body 21 has been lowered by actuating the cylinder 15, the chuck segments 22 are expanded in diameter toward the lower bead portion Tb of the green tire T from above by again actuating the cylinder 19, and centering of the lower bead portion Tb is effected by means of the lower projections of the centering rods 23 (FIG. 7).

Next, the lower bead portion Tb is forcibly inserted into the lower bead ring Mc of the metal mold M by lowering the bolster 2 to such extent that the cylinder 15 may be pushed back a little. It is to be noted that the reason why the bolster 2 is lowered to such extent that the cylinder 15 may be pushed back a little is so that not only will the lower bead portion Tb be inserted into the lower bead ring Mc but also the weight of the green tire T will be supported by the lower bead ring Mc.

Thereafter, the chuck segments 22 and the holder arms 27c are returned to their standby positions (the state shown by solid lines in FIG. 1), the bladder B is inserted to the inside of the green tire, and subsequently the operation proceeds to the normal shaping and vulcanizing steps.

As will be obvious from the detailed description of one preferred embodiment of the present invention above, according to the present invention, the following advantages are obtained, by a green tire charging apparatus for a tire vulcanizing machine, wherein holders (27), having holder arms (27c) projected horizontally from their bottom ends, are elevatably and rotatatly fitted around posts (18) connecting a chuck body (21) with a chuck upper plate (17) mounted to a bottom end of a chuck elevator cylinder (15) fixed to the inside of an inner cylinder (12) for operating metal mold means; a plurality of chuck segments (22), which are synchronously slidable in the radial directions, are provided on the chuck body (21); each chuck segment is provided with a centering rod (23), which projects a little from the upper and lower surfaces of the same segment at a position somewhat inside of its outer end, and which is vertically slidable; the chuck body (21) is inserted into a tire (T); the chuck segments (22) are expanded to concentrically hold an upper bead portion (Ta) by means of upper projections of the centering rods (23); the chuck body (21) is raised to insert the upper bead portion (Ta) into an upper bead ring (Mb); subsequently the holder arms (27c) are made to swing out and rise to hold the upper bead portion (Ta); and then the chuck body (21) is lowered to concentrically hold a lower bead portion (Tb) by means of lower projections of the centering rods (23) and to insert the lower bead portion (Tb) into a lower bead ring (Mc).

That is, the upper and lower bead portions of a tire can be made to surely sit on the corresponding bead rings of a metal mold, even if a green tire is used which has a degree of parallelism between the upper and lower bead portions degraded due to deformation, and also the problem in the prior art of consuming a large amount of compressed fluid can be obviated.

While a principle of the present invention has been described above in connection to one preferred embodiment of the invention, it is a matter of course that many apparently widely different embodiments of the present invention could be made without departing from the spirit of the present invention.

What is claimed is:

1. A green tire charging apparatus for a tire vulcanizing machine, comprising: holders having holder arms projected horizontally from bottom ends thereof; an inner cylinder for operating a metal mold having an upper bead ring and a lower bead ring; a chuck elevator cylinder fixed to an inside of said inner cylinder; a chuck body which is insertable into a tire; a chuck upper plate mounted to a bottom end of said chuck elevator cylinder; posts connecting said chuck body with said chuck upper plate, said holders being elevatably and rotatably fitted around said posts; a plurality of chuck segments, which are synchronously slidable in radial directions, provided on said chuck body; centering rods vertically slidably mounted in said chuck segments at positions inwardly of outer ends thereof, respectively, said entering rods having upper portions projecting above upper surfaces of said chuck segments and lower portions projecting below lower surfaces of said chuck segments, respectively; means for radially expanding said chuck segments by causing them to synchronously slide radially outwardly; wherein said upper portions of said centering rods constitute means for concentrically holding an upper bead portion of the tire when said chuck segments are expanded; wherein said lower portions of said centering rods constitute means for concentrically holding a lower bead portion of the tire; wherein said chuck elevator cylinder constitutes a means for raising and lowering said chuck body; and wherein means are provided for causing said holder arms to swing up and rise; whereby said chuck body is raised to insert the upper bead portion of the tire into the upper bead ring of the metal mold, subsequently said holder arms are made to swing out and rise to hold the upper bead portion, and then said chuck body is lowered to cause said means defined by said lower portions of said centering rods to concentrically hold a lower bead portion of the tire and to insert the lower bead portion of the tire into a lower bead ring of the metal mold.

2. A green tire charging apparatus for a tire vulcanizing machine as claimed in claim 1, wherein said means for radially expanding said chuck segments comprises: a chuck opening cylinder fixed to said chuck upper plate, said chuck opening cylinder having a piston rod; a cam plate fixedly secured to said piston rod; and levers having first ends engaged with said chuck segments, respectively, and second ends engaged with said cam plate.

* * * * *